(12) United States Patent
Mayrhofer

(10) Patent No.: US 8,356,996 B2
(45) Date of Patent: Jan. 22, 2013

(54) MOTION AND ORIENTATION SIMULATOR

(75) Inventor: Michael Mayrhofer, Ranshofen (AT)

(73) Assignee: AMST-Systemtechnik GmbH, Ranshofen (AT)

( * ) Notice: Subject to any disclaimer, the term of this patent is extended or adjusted under 35 U.S.C. 154(b) by 690 days.

(21) Appl. No.: 12/573,971

(22) Filed: Oct. 6, 2009

(65) Prior Publication Data

US 2010/0105012 A1   Apr. 29, 2010

(30) Foreign Application Priority Data

Oct. 9, 2008  (AT) ................. A 1583/2008

(51) Int. Cl.
 *G09B 9/08* (2006.01)
(52) U.S. Cl. ........................................... 434/55
(58) Field of Classification Search ............. 434/27, 434/30, 34, 55, 57, 58, 61, 62; 472/27–29, 472/31
See application file for complete search history.

(56) References Cited

U.S. PATENT DOCUMENTS

| | | | | |
|---|---|---|---|---|
| 4,710,128 A * | 12/1987 | Wachsmuth et al. | ........... | 434/46 |
| 5,060,932 A * | 10/1991 | Yamaguchi | ................. | 472/47 |
| 5,792,031 A * | 8/1998 | Alton | ............................. | 482/78 |
| 6,017,276 A * | 1/2000 | Elson et al. | ................... | 472/60 |
| 6,077,078 A * | 6/2000 | Alet et al. | ........................ | 434/55 |
| 6,406,299 B1 * | 6/2002 | Murao et al. | .................. | 434/29 |
| 6,902,402 B2 * | 6/2005 | McClintic | ....................... | 434/30 |
| 6,910,971 B2 | 6/2005 | Alsenz | ............................ | 472/59 |
| 7,530,929 B2 * | 5/2009 | Feldman et al. | ................. | 482/57 |
| 7,559,766 B2 * | 7/2009 | Epley et al. | .................... | 434/34 |
| 7,866,982 B1 * | 1/2011 | Whitsitt | ......................... | 434/28 |
| 8,066,576 B2 * | 11/2011 | Threlkel | ......................... | 472/47 |
| 8,147,344 B2 * | 4/2012 | Crawford et al. | ............... | 472/59 |
| 2010/0216097 A1 * | 8/2010 | Romagnoli et al. | ........... | 434/35 |

* cited by examiner

*Primary Examiner* — Kurt Fernstrom
(74) *Attorney, Agent, or Firm* — Andrew Wilford

(57) ABSTRACT

The invention relates to a motion and orientation simulator with a cardanic suspension (4) for a cabin (5) that is carried by a heave carriage (3) that can be moved in a straight line in a carriage cage (2), characterized in that the carriage cage (2) is rotatable and that a cable drive is provided for the straight-line movement of the carriage (3) in the carriage cage (2).

26 Claims, 7 Drawing Sheets

MOTION AND ORIENTATION SIMULATOR

FIELD OF THE INVENTION

The invention relates to a motion and orientation simulator with a cardanic suspension for a cabin that is carried by a heave carriage that can be moved in a straight line in a carriage cage.

BACKGROUND OF THE INVENTION

Simulators of this type are used for training and safety training of pilots. The object of simulators of this type is to simulate flight conditions as realistically as possible, such as can also occur in extreme cases in flight operation, such as, for example with helicopters and aircraft in combat deployment. US 2004/0197742 [U.S. Pat. No. 6,910,971] describes an example of simulators.

One problem of simulators of this type is that relatively large masses have to be steplessly accelerated, braked, rotated or otherwise moved, so that high demands are made on the drive system and the statics of the individual components.

OBJECT OF THE INVENTION

The object of the present invention is to provide a simulator of this type that can simulate all conceivable motion and orientation conditions and is thereby reliable in operation, has compact dimensions and can be produced at a reasonable cost.

SUMMARY OF THE INVENTION

With the present invention of the motion and orientation simulator mentioned above with a cardanic suspension for a cabin that is carried by a heave carriage that can be moved in a straight line in a carriage cage, the object is attained in that the carriage cage is rotatable and that a cable drive is provided for straight-line movement of the carriage in the carriage cage, rotatable heave pulley assemblies for displacing the heave carriage being provided on the heave carriage and the cable drive having cable stretches acting on the heave carriage and transferring force to the heave carriage, the cable stretches being preferably formed as cable loops reeved around the heave pulley assemblies.

Furthermore, the cable stretches acting on the heave carriage are arranged in pairs acting against one another, and the pairs of cable stretches acting against one another to displace the heave carriage are prestressed with respect to one another via a tensioning device. In addition, the invention is characterized in that the sum of the distances between the cable stretches acting in pairs on the heave carriage and the associated idler sheaves lying nearest in the cable direction is constant on displacement of the heave carriage, that the carriage cage is supported in a rotatable manner and projects diametrally from the rotation axis and that the heave carriage can be moved on both sides of the rotation axis of the projecting carriage cage, that the cable drive has cables that are held taut with a tensioning device, that the cable drive has an upright cable attached on or to the carriage cage, that the cable drive is guided around a front and rear idler pulley assembly supported on the carriage cage, around a heave pulley assembly supported on the carriage and around a cable drive sheave, and that motors and coupling elements for transferring the forces are provided to drive the rotation of the carriage cage, the coupling elements being preferably embodied as friction rings. Furthermore, according to the invention motors and coupling elements for transferring the forces are provided to drive the cable drive sheave, the coupling elements preferably being as friction rings, that the motors for driving the carriage cage and the motors for moving the heave carriage are fixed, that the cable in addition is guided around a tension sheave arranged on the carriage cage and that the front and rear idler pulley assemblies each comprise two idler sheaves. Further advantageous features are that the heave pulley assembly has four heave sheaves rotatable independently of one another on the carriage, that two heave bolts each support a respective two of the heave sheaves, that the two cable stretches leading from the cable drive sheave are guided over a front and a rear idler sheave and from there on to respective ones of the heave sheaves, that the tension sheave forms a fifth idler sheave and that the anchor of one end of the cable is arranged on the front end and the other anchor of the other end is arranged on the rear end of the carriage cage.

The simulator according to the invention is also characterized in that the carriage cage is embodied as a rotatably supported, two-sided centrifuge arm and can be set in rotation by a drive, that the cardanic suspension arranged on the carriage with the cabin suspended therein can be moved vertically by a vertical lift and that the combined length of the cable stretch V extending from the idler sheave to the cable drive sheave, of the cable stretch VI extending from the cable drive sheave to the tension sheave, and of the cable stretch VII extending from the tension sheave to the idler sheave are provided does not change.

Finally, the simulator is also characterized in that on rotation of the drive sheave the cable stretches I, II, III and IV, depending on the direction of rotation, get shorter or longer and the cable stretches VIII, IX, X and XI get longer or shorter, effecting straight-line displacement of the heave carriage, that the cable stretches I through XI are in three planes E1 through E3 arranged one above the other, that the heave pulley assemblies and two of the idler sheaves are tilted to change the plane, that the cable stretches II and X are in the uppermost plane E1, the cable stretches I, IX, III, XI are in the center plane E2 and the cable stretches VIII, VII/VI, V and IV are in the lowest plane E3, that the cable stretches I and XI end in the anchors P1 and P2 and that on rotation of the drive sheave the heave sheaves rotate oppositely to the heave sheaves and codirectionally with the drive sheave.

BRIEF DESCRIPTION OF THE DRAWING

Further advantageous features are shown by the following description as well as the drawings.

The invention is described below based on an illustrated embodiment.

DETAILED DESCRIPTION

Figure 1:
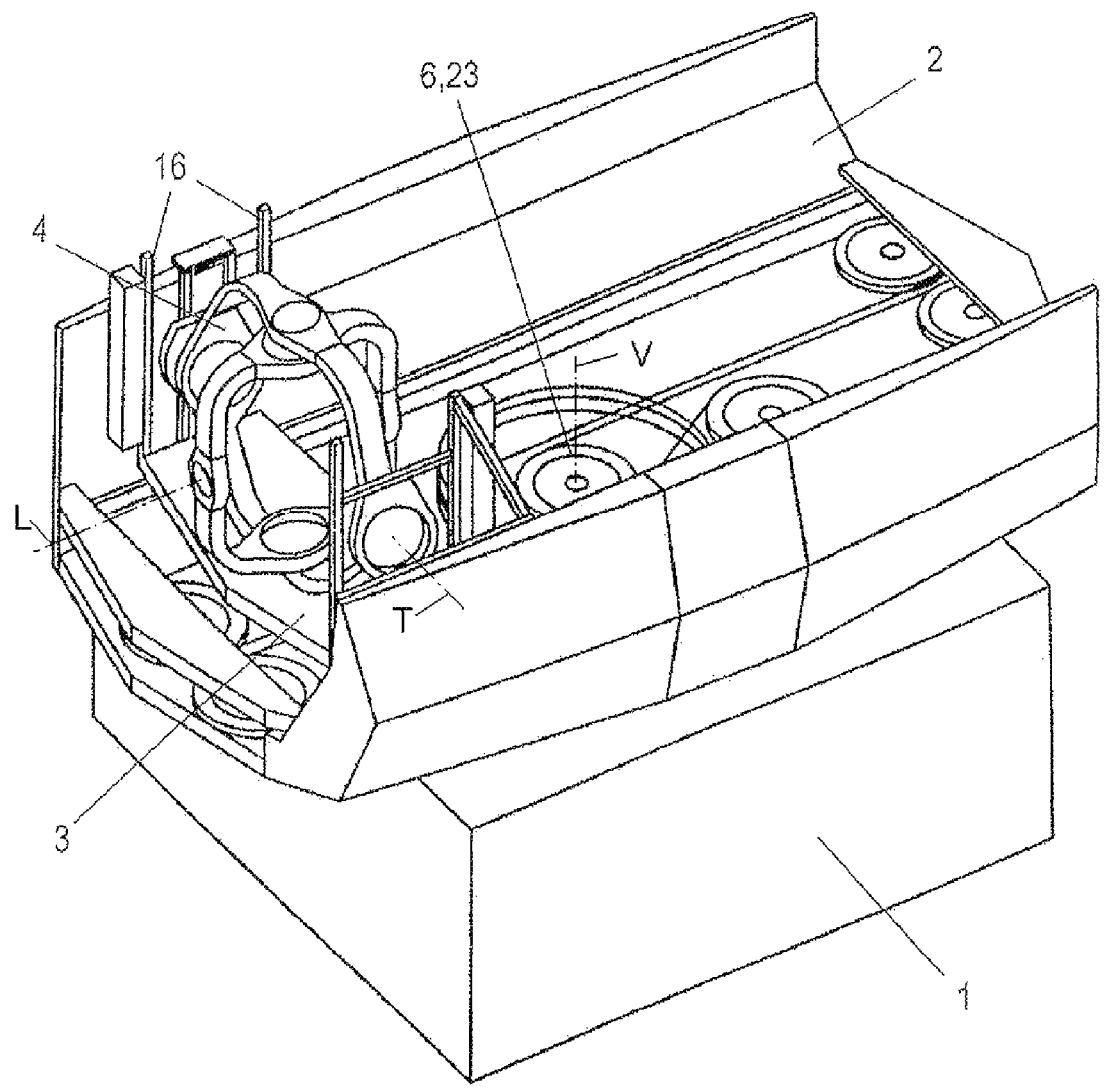
FIG. 1 is an isometric view of the motion and orientation simulator according to the invention.
Figure 2:
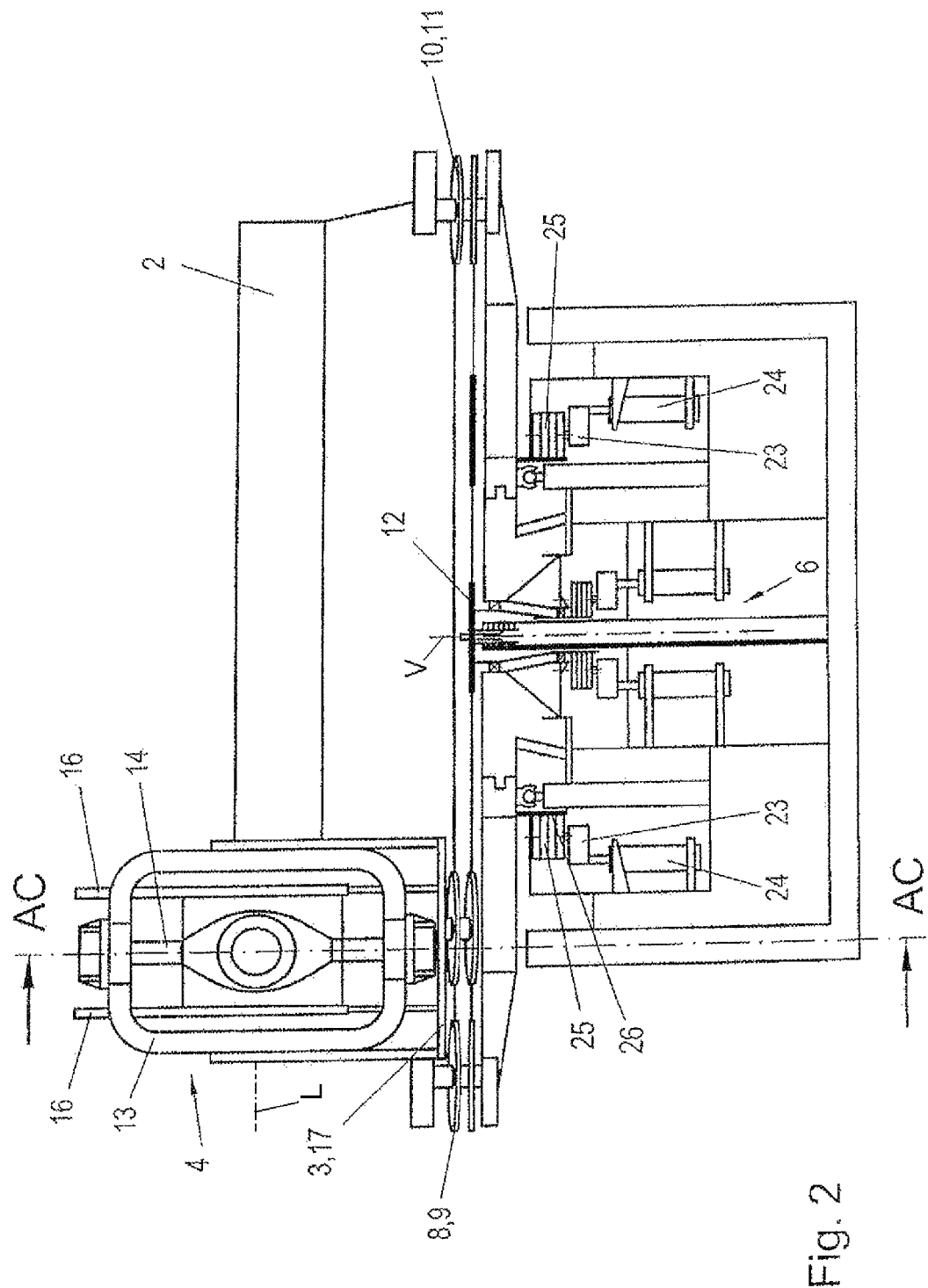
FIGS. 2 and 3 are sections through the simulator according to the respective section lines.

According to FIG. 1, the simulator is mounted on a fixed base 1 that holds the drive that can rotate a carriage cage 2. The carriage cage is a torsionally stiff and can withstand high forces. The carriage cage acts like a two-sided centrifugal arm of a conventional centrifuge, where a heave carriage 3 can be slid longitudinally along the carriage cage and itself carries a cardanic suspension 4. A cabin 5 in the center of the cardanic suspension 4 can accommodate one or a maximum of two seated test persons. This cabin 5 is only shown by a dashed line in FIG. 3. The cabin 5 can be for example an aircraft cabin with the corresponding audiovisual installations, but it can also be the control area of another vehicle, such as for example an automobile. The heave carriage 3 with its cardanic suspension can be moved along the carriage cage between two end positions. In FIG. 1 the carriage is located in the left end position, is referred to below as the front position. When the carriage is moved into the right end position, it is located in the rear position, the terms forward and rear being defined in an arbitrary manner merely for the purpose of distinction. FIG. 2 is a longitudinal section taken along line AA-AA of FIG. 4, this section also passing through the base 1 and the drive 23 for the carriage cage 2 and the cable drive 6. Idler sheaves, namely two idler sheaves for drive cables 7 for moving the carriage, are located on each of the two ends of the floor of the carriage cage 2. Front idler sheaves 8 and 9 are thus rotatably mounted on the front end of the carriage cage, and rear idler sheaves 10 and 11 on the rear end of the carriage cage.

Basically there are two drives, namely the drive 23 for rotating the carriage cage and a cable drive 6 for horizontally moving the heave carriage 3 along the carriage cage.

The cardanic suspension 4 comprises as is known two cardan yolks, namely the yaw ring 13 and the roll ring 14 whose relative positions can be adjusted and rotated as desired. Furthermore, the entire cardanic suspension is mounted in a rotatable manner on a vertical lift 15 so that the cabin located in the cardanic suspension can also be acted on with a component of vertical motion.

The drive 23 for the carriage cage comprises several—for example, eight—motors 24, which rotate drive rings 26 via friction rings 25. The description of the cable drive 6 follows below with reference to FIG. 5.

Figure 3:
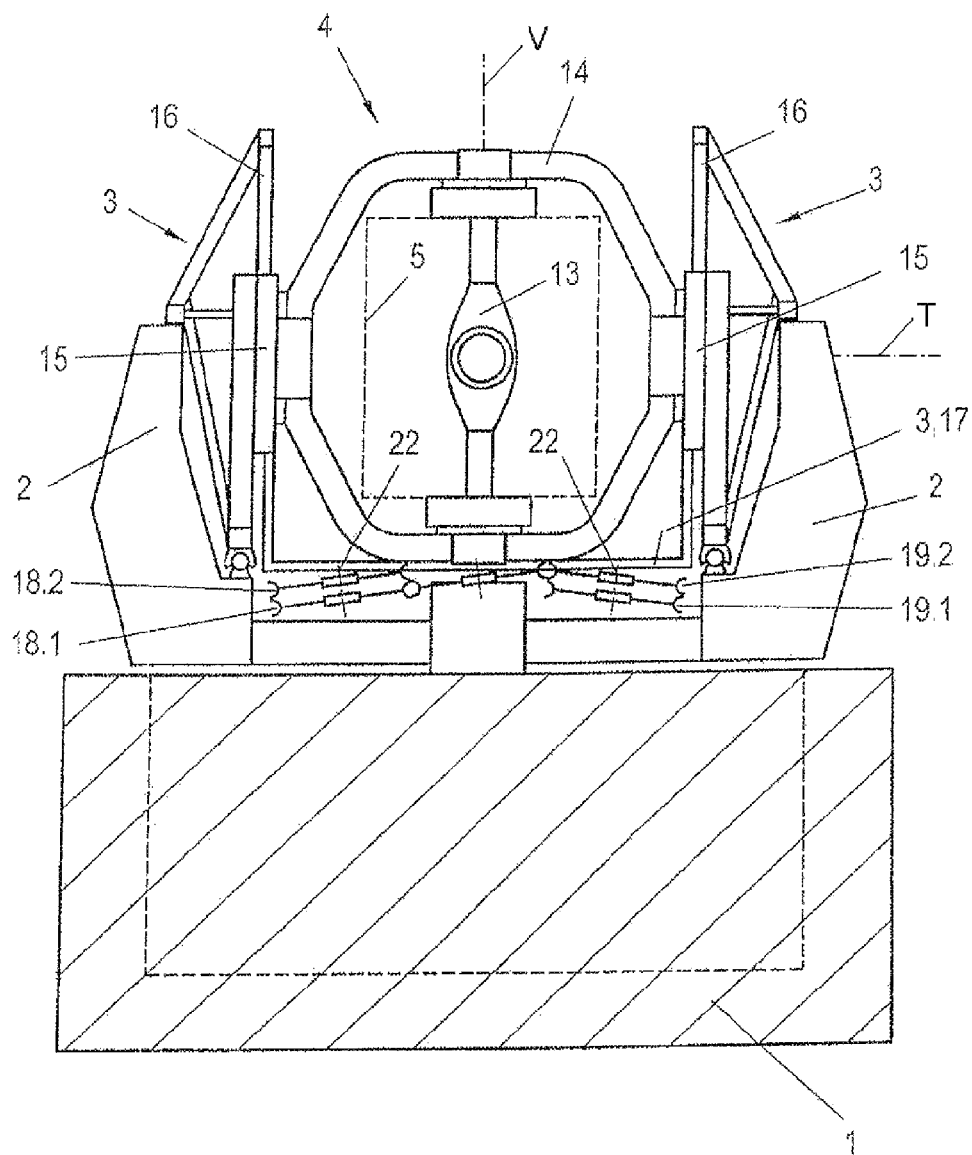

The section of FIG. 3 is taken along line AC-AC in FIG. 2 and shows the structure of the simulator. As can be seen, the carriage cage 2 is shaped like a boat and the heave carriage 3 is guided on rails of the carriage cage. Vertical lift rails 16 are on both sides of the heave carriage 3, and the vertical lift 15 with the cardanic suspension 4 and cabin 5 can moved vertically on these lift rails. Two heave pulley assemblies 18 and 19 are provided in the base 17 of the carriage 3, common heave bolts 22 each rotatably supporting two heave sheaves 18.1, 18.2 and 19.1, 19.2.

Figure 4:
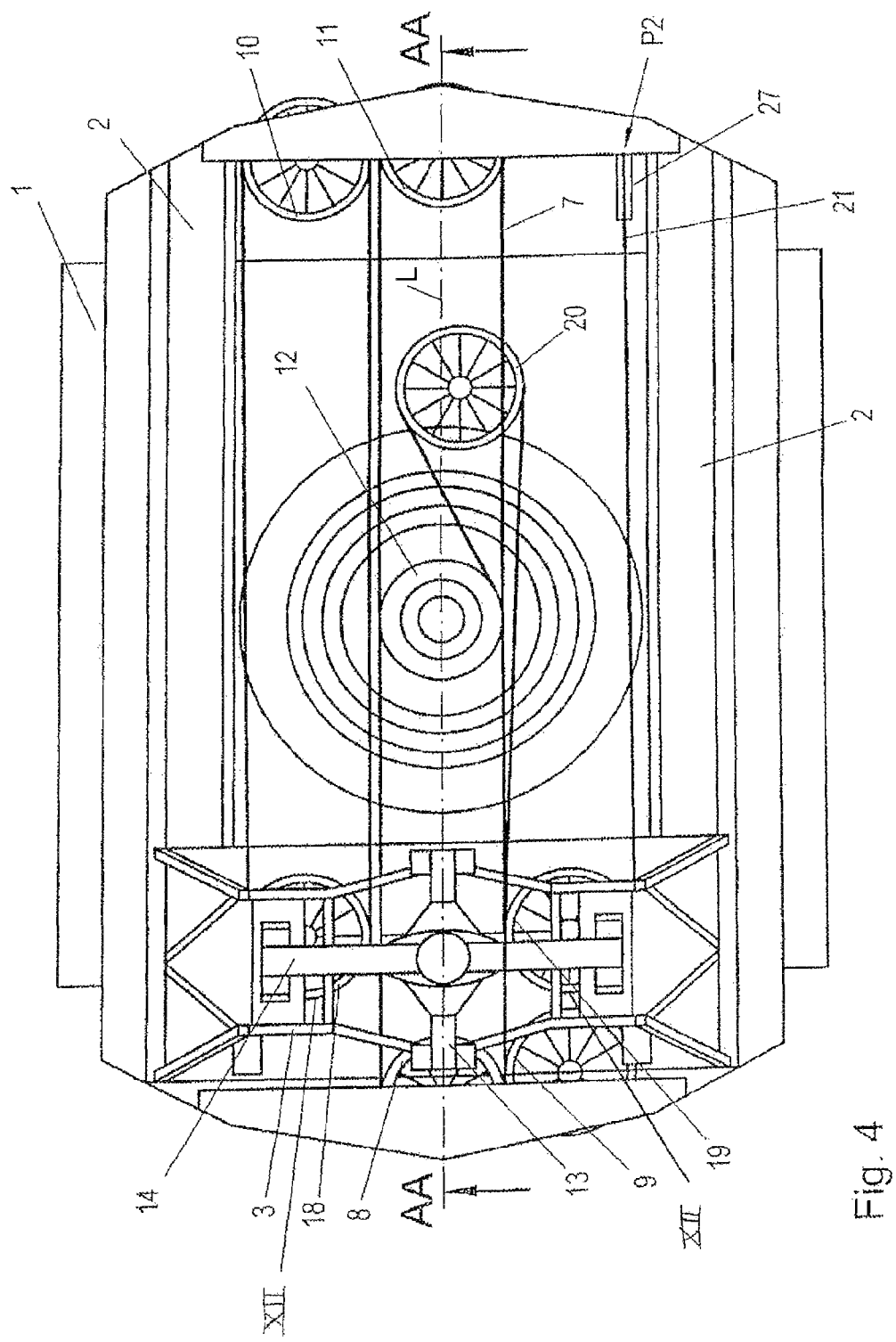
FIG. 4 is a top view of the simulator.

FIG. 4 is a top view of the simulator, the heave carriage 3 being shown in the left, that is front, position. A central cable drive sheave 12 is shown that can move the carriage 3 inside the carriage cage in a straight line. The two front idler sheaves 8 and 9 and the rear idler sheaves 10 and 11 for deflecting the cable 7 are, as already mentioned above, rotatably mounted on the carriage cage 2. The heave pulley assemblies 18 and 19 are rotatably mounted on the carriage 3 independently of one another. Furthermore, a tension sheave 20 can be seen that as an idler sheave for the cable 7 and is used to keep the cable 7 taut. Ends 21 of the cable 7 are firmly attached to the carriage cage, namely to respective opposite ends of the carriage cage. In FIG. 4 one of the cable ends with its cable anchor 27 is shown at a suspension point P2. The other cable end and its suspension point P1 is covered by the carriage 3.

Figure 5:
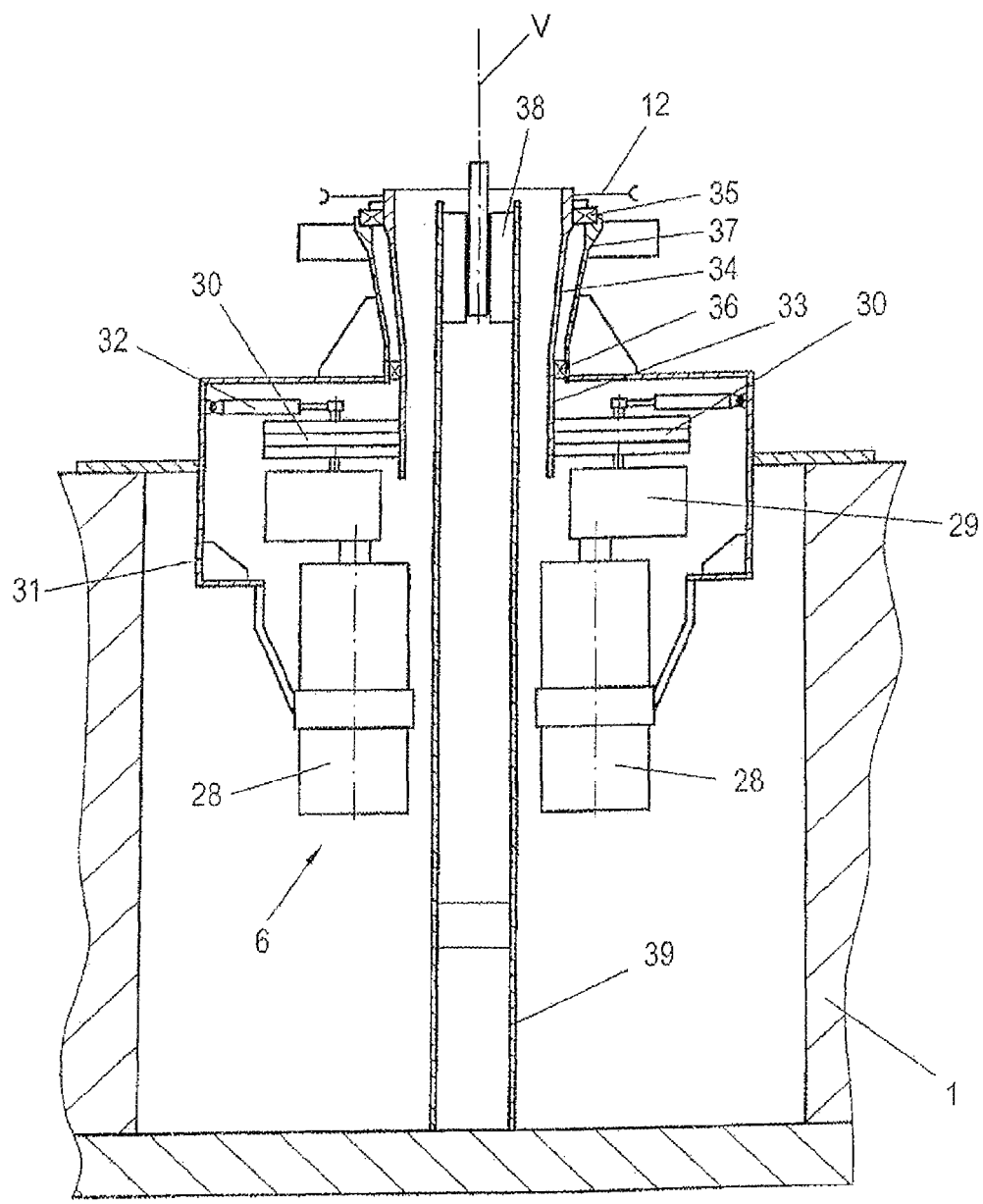
FIG. 5 is a section through the cable drive.

The cable drive 6 is described in somewhat more detail with reference to FIG. 5. Motors 28—in this case five of them—with respective transmissions 29 and three respective friction rings 30 are mounted on a motor housing 31. The motor assemblies are pivotally suspended and respective pneumatic cylinders 32 press the friction rings 30 against a driven ring 33. The driven ring 33 is attached to the lower end of a tube shaft 34 that transfers rotation to the cable drive sheave 12. The tube shaft 34 is supported in the cable drive housing 37 by an "upper" bearing 35 and a "lower" bearing 36. FIG. 5 also shows a journal 38 and a journal holder 39. Since the entire electronic system has to be guided through the tube shaft and through the journals, the cable drive train is provided with a tube shaft.

In any case the motor-driven cable drive sheave 12 with the cable guide for the cable 7 is used to move the heave carriage 3 in the carriage cage 2.

Figure 6:
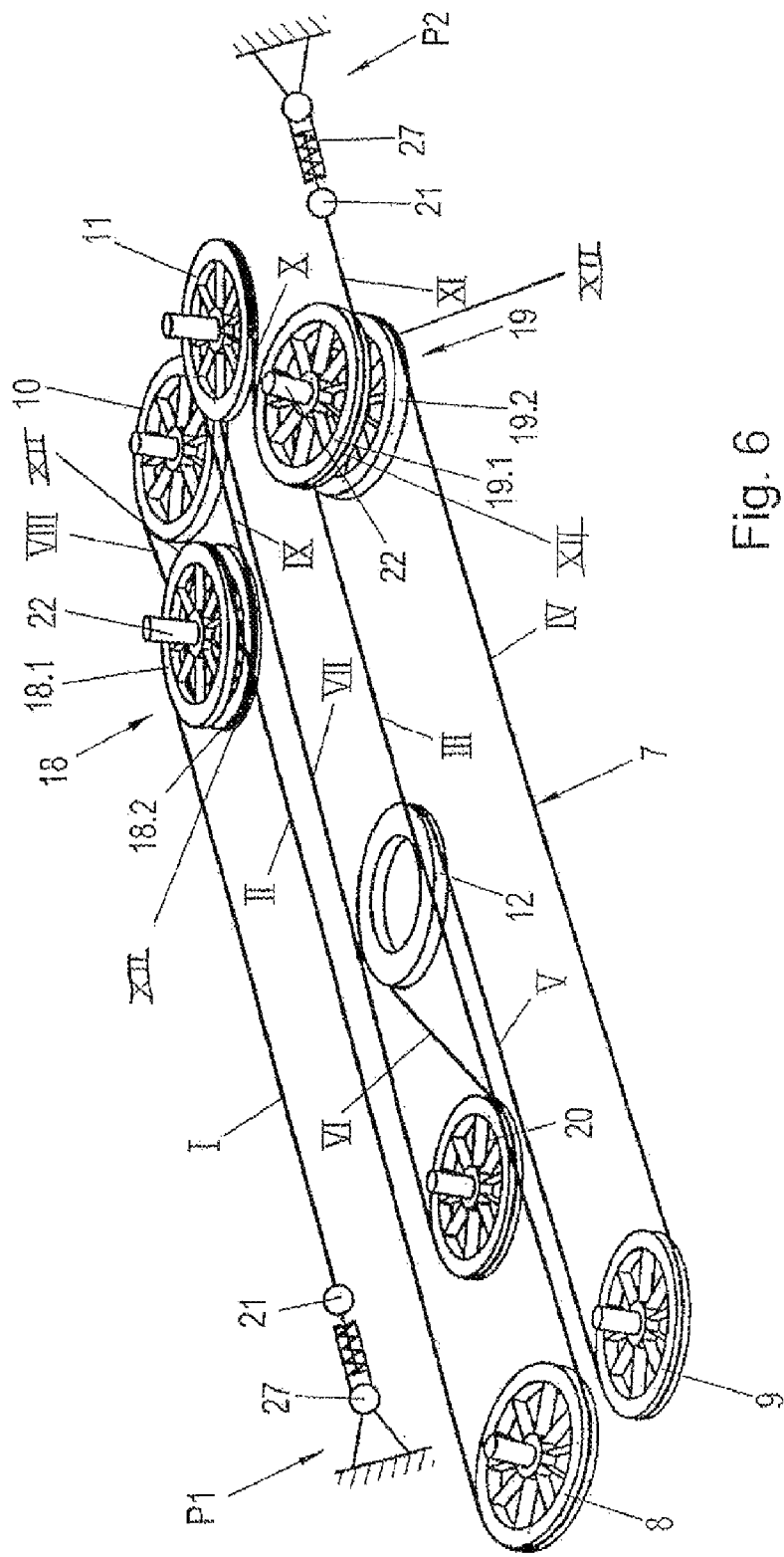
FIG. 6 diagrammatically shows the cable guide with the idler sheaves and heave sheaves.

FIG. 6 diagrammatically shows how the cable 7 is guided between the two anchors P1 and P2, the forward idler sheaves 8 and 9, the rear idler sheaves 10 and 11, the drive sheave 12 and tension sheave 20, all of which are mounted on the carriage cage in a rotatable manner, and the two heave pulley assemblies 18 and 19, which are rotatable on the carriage and can move it in a straight line.

In the position shown the heave pulley assemblies 18 and 19 are located in the rear end position. In order to move the heave pulley assemblies and with them the carriage to the left into the front position, the drive sheave 12 must be rotated counter-clockwise so that cable stretches I and II are shortened and cable stretches VIII and IX are identically lengthened. Similarly, cable stretches III and IV are shortened and cable stretches X and XI are lengthened. Rotation of the heave sheaves 18.1, 18.2, and 19.1, 19.2 located one above the other is carried out in each case in the opposite direction.

Figure 7:
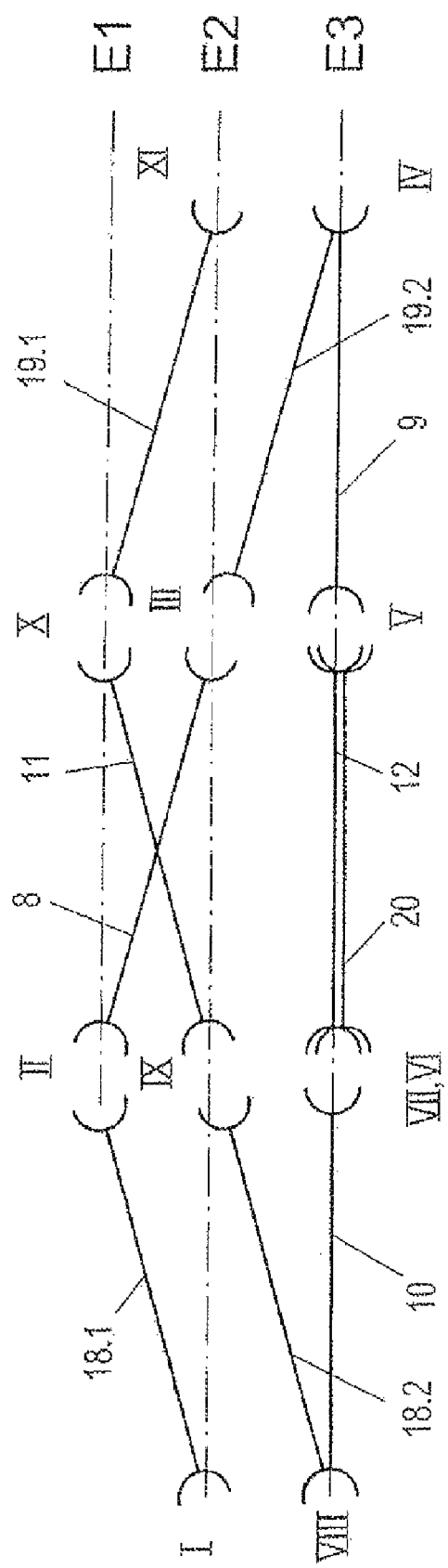
FIG. 7 shows the assignment of the cable stretches to individual planes with the assigned sheaves.

FIG. 7 shows that the cable stretches are guided in different planes, namely in the three planes E1, E2 and E3. This division into different planes is necessary so that the cable guides do not interfere with one another. To move between the planes, the heave pulley assemblies 18 and 19 and the idler sheaves 8 and 11 are tilted.

The cable stretches II and X are in the uppermost plane E1, the cable stretches I, IX, III, and XI are in the center plane E2 and the cable stretches VIII, VII/VI, V and IV are in the lowest plane E3, wherein the cable stretches I and XI end in the anchors P1 and P2.

Furthermore the cable stretches XII acting on the heave carriage are also indicated in FIG. 4 and FIG. 6.

The invention described above is explained in more detail below with respect to its mode of operation. As mentioned above, the simulator is used to simulate moving systems, such as for example land vehicles, watercraft, aircraft, or the like. Virtual reality is simulated to the user in the cabin 5 via a plurality of artificially generated sensory perceptions, and the user, as described below, can also have an active influence. These sensory stimuli on the one hand are audiovisual stimuli conveyed to the user via image- and sound-reproduction systems. On the other hand, the system of this invention generates accelerations and forces that act on the user. By the combination of audiovisual and physical sensory impressions, the human brain interprets virtual states of motion. How realistic this interpretation seems to the user depends on how exact the sensory perceptions resemble the real sensory perceptions of such situations. For this reason it is very important to convey these signals to the user in the most realistic manner possible.

Furthermore, with the present motion and orientation simulator an operating element is provided, via which the user can control the movements of the moving system in the virtual world.

This control signal from the user and any environmental influences (for example wind, road surface), which can also be described as disturbance variables, are fed to a physical simulation model. This corresponds to a mathematical image of the real behavior of the simulated object. It contains variables such as inertia, resistance, etc. With the aid of this model the accelerations or forces and their orientations are calculated and are fed to the user in the virtual world.

These accelerations are generated by the motion and orientation simulator according to the invention in different ways.

Acceleration by Rotation of the Carriage Cage:

The carriage cage 2 rotates about its vertical rotation axis from which it projects diametrally. The heave carriage 3 can move in a straight line on the carriage cage. If the heave carriage 3 is located exactly above the rotation axis of the rotating carriage cage, no accelerations at all act on its occupant. Although the occupant rotates about his body axis, he perceives this state as an unmoving state, since he lacks the visual stimuli of rotation in the closed cabin 5.

If the heave carriage now moves away from the rotation axis, the radial acceleration primarily increases with spacing from the rotation axis. The resulting acceleration from gravitational acceleration and the radial acceleration is perceived by the user. If the heave carriage moves back again and crosses over the rotation axis of the carriage cage, the user experiences a change of the orientation of the radial acceleration. An oscillation of the heave carriage about the rotation axis, for example, corresponds to the accelerations of a slalom course in an automobile.

In order to vary the extent of this resulting acceleration, either the angular velocity of the carriage cage can be varied or the heave carriage can be moved further outward in a variable manner.

Acceleration by Straight-Line Drives:

The linear velocity change of the heave carriage 3 along the carriage cage 2 by the cable drive 6 according to the invention as well as the straight-line velocity change [4] of the cardanic suspension by the vertical lift 15 are further options for exerting accelerations on the user.

Change of Direction of the Acceleration:

In order to change the direction of the resulting acceleration acting on the body, it is necessary to move the body itself, in order to thus evoke the impression of a change in the direction of acceleration. This occurs with the aid of the cardanic suspension 4 of the cabin 5. This cardanic suspension comprises two cardan yolks, namely the yaw ring 13 and the roll ring 14 whose relative positions can be adjusted and rotated as desired. Via these in total three rotational degrees of freedom the cabin 5 and thus the body of the user can now be rotated as desired. In addition, the entire cardanic suspension can rotate on the vertical lift 15.

Because of this plurality of degrees of freedom as well as acceleration possibilities, sequences of motions can be simulated for the body in a variety of ways. This flexibility is a great advantage of the present invention.

A number of drives are provided to move the components of the motion and orientation simulator. The control variables for these drives are either calculated from the physical simulation model or can be stipulated manually from a control center. The generation of the audiovisual stimuli can likewise either be produced from a physical simulation model or can follow a fixed sequence.

Definition of the Axes of Motion of the Preferred Embodiment:

The pivot axis of the carriage cage is vertically plumb.

The longitudinal movement of the heave carriage 3 in the carriage cage 2 takes place along a straight line that extends orthogonally to and intersects the rotation axis of the carriage cage 2.

The direction of motion of the vertical lift in turn is perpendicular to the straight-line movement axis of the heave carriage and thus parallel to the rotation axis of the carriage cage 2.

The pivot axis of the cardanic suspension 4 with reference to the vertical lift 15 extends tangentially to the orbit of the carriage cage and thus is horizontal and perpendicular to the travel direction of the vertical lift 15.

The rotation axis provided by the yaw ring 13 extends perpendicular to the rotation axis of the cardanic suspension in the vertical lift and the rotation axis of the cabin in the roll ring in turn runs orthogonally to the rotation axis of the yaw ring 13.

The pivot axes of the yaw ring 13, the roll ring 14 and the suspension in the vertical lift thus all intersect.

In this preferred embodiment all of the above referenced degrees of freedom are provided with respective drives operating independently of one another and, apart from the straight-line drives, moveable in an unlimited manner, that is, they can be rotated as far as desired.

The invention claimed is:

1. A motion and orientation simulator comprising:
   a base;
   a carriage cage rotatable on the base;
   a heave carriage movable in a straight line on the carriage cage;
   a cardanic suspension carried by the heave carriage;
   a cabin rotatably carried by the cardanic suspension on the heave carriage; and
   a cable drive for straight-line movement of the carriage in the carriage cage.

2. The simulator according to claim 1, further comprising:
   rotatable heave pulley assemblies on the heave carriage for displacing the heave carriage.

3. The simulator according to claim 2 wherein the cable drive has cable stretches acting on the heave carriage and that can transfer force to the heave carriage, the cable stretches being formed as cable loops reeved around the heave pulley assemblies.

4. The simulator according to claim 3 wherein the cable stretches acting on the heave carriage are arranged in pairs acting against one another.

5. The simulator according to claim 4, further comprising:
   a tensioning device prestressing the pairs of cable stretches acting against one another to displace the heave carriage.

6. The simulator according to claim 4 wherein a sum of distances between the cable stretches acting in pairs on the heave carriage and respective idler sheaves lying nearest along a cable is constant on movement of the heave carriage.

7. The simulator according to claim 1 wherein the carriage cage is rotatably supported at and projects diametrally from a rotation axis and the heave carriage can be moved diametrally to both sides of the rotation axis of the projecting carriage cage.

8. The simulator according to claim 1 wherein the cable drive has cables held taut by a tensioning device.

9. The simulator according to claim 1 wherein the cable drive comprises:
   a cable fixed to the carriage cage,
   front and rear idler pulleys supported on the carriage cage, a heave pulley supported on the carriage, and a cable drive sheave, the cable being guided around the front and rear idler pulleys, around the heave pulley, and around the drive sheave.

10. The simulator according to claim 9, further comprising:

motors and friction rings for transferring forces to rotate the carriage cage.

11. The simulator according to claim 10, further comprising:

motors and friction rings that drive the cable drive sheave.

12. The simulator according to claim 11, wherein the motors for rotating the carriage cage and motors for moving the heave carriage are fixed.

13. The simulator according to claim 11, wherein the cable is guided around a tension sheave on the carriage cage.

14. The simulator according to claim 9 wherein the front and rear idler pulleys each have two respective idler sheaves.

15. The simulator according to claim 14 wherein the heave pulleys each include four respective heave sheaves rotatable independently of one another on the carriage.

16. The simulator according to claim 15 wherein two heave bolts each support two of the heave sheaves.

17. The simulator according to claim 15 wherein the cable has two cable stretches leading from the cable drive sheave and guided over respective front and a rear idler sheaves and from there each on to a respective one of the heave sheaves.

18. The simulator according to claim 14 wherein a tension sheave forms a fifth idler sheave.

19. The simulator according to claim 1 wherein the cardanic suspension on the carriage with the cabin suspended therein can be moved vertically by a vertical lift.

20. The simulator according to claim 1, further comprising:

an anchor on a front end of the carriage cage and secured to one end of a cable of the cable drive and another end of the cable is secured to a rear end of the carriage cage.

21. The simulator according to claim 1 wherein the carriage cage is a rotatably supported, two-sided centrifuge arm and can be rotated by a drive.

22. The simulator according to claim 14 wherein a combined length of a cable stretch V extending from each idler sheave to the respective cable drive sheave, of a cable stretch VI extending therefrom to the respective tension sheave, and of a cable stretch VII extending therefrom to the idler sheave is constant.

23. The simulator according to claim 1 wherein on rotation of the drive sheave cable stretches I, II, III and IV preceding cable stretches V, VI, and VII, depending on the direction of rotation, are shortened or lengthened and cable stretches VIII, IX, X and XI downstream of cable stretches following stretches V, VI, and VII are complementarily lengthened or shortened, thereby causing straight-line movement of the heave carriage.

24. The simulator according to claim 1 wherein cable stretches I through XI are arrayed in uppermost center, and lowest planes one above the other, the respective heave pulley assemblies and two of the respective idler sheaves being tilted relative to the respective planes.

25. The simulator according to claim 1, further comprising:

front and rear anchors on front and rear ends of the carriage cage and secured to respective front and rear ends of a cable of the cable drive with cable stretches II and X in the uppermost plane, cable stretches I, IX, III, XI in the center plane and cable stretches VIII, VII/VI, V and IV in the lowest plane, the cable stretches I and XI terminating at the front and rear anchors.

26. The simulator according to claim 1 wherein the cable drive has cable stretches acting on the heave carriage and that can transfer force to the heave carriage, the cable stretches being arranged in pairs acting against each other.

* * * * *